United States Patent [19]

Hammond

[11] Patent Number: 5,119,293
[45] Date of Patent: Jun. 2, 1992

[54] SYSTEM AND APPARATUS FOR DISPENSING NEGOTIABLE INSTRUMENTS

[75] Inventor: Richard W. Hammond, Dallas, Tex.

[73] Assignee: Republic Money Orders, Inc., Dallas, Tex.

[21] Appl. No.: 494,538

[22] Filed: Mar. 16, 1990

Related U.S. Application Data

[63] Continuation of Ser. No. 245,346, Sep. 16, 1988, abandoned.

[51] Int. Cl.5 ............................................. G06F 15/21
[52] U.S. Cl. ................................... 364/401; 364/405; 364/406; 364/479; 235/379
[58] Field of Search ............... 364/400, 401, 405, 406, 364/479; 235/379

[56] References Cited

U.S. PATENT DOCUMENTS

| | | |
|---|---|---|
| 2,071,141 | 2/1937 | Placke . |
| 3,814,227 | 6/1974 | Hurd, III et al. . |
| 3,848,798 | 11/1974 | Riley . |
| 3,970,992 | 7/1976 | Boothroyd et al. . |
| 3,984,660 | 10/1976 | Oka et al. . |
| 3,997,763 | 12/1976 | Schasser . |
| 4,025,905 | 5/1977 | Gorgens . |
| 4,035,792 | 7/1977 | Price et al. . |
| 4,053,735 | 10/1977 | Foudos . |
| 4,082,945 | 4/1978 | van de Goor et al. . |
| 4,175,694 | 11/1979 | Donabin . |
| 4,225,779 | 9/1980 | Sano et al. . |
| 4,266,121 | 5/1981 | Hirose . |
| 4,270,042 | 5/1981 | Case . |
| 4,317,028 | 2/1982 | Simjian . |
| 4,321,671 | 3/1982 | Ohsako . |
| 4,328,544 | 5/1982 | Baldwin et al. .................... 364/405 |
| 4,341,951 | 7/1982 | Benton . |
| 4,355,369 | 10/1982 | Garvin . |
| 4,385,285 | 5/1983 | Horst et al. . |
| 4,417,137 | 11/1983 | Lundblad . |
| 4,589,069 | 5/1986 | Endo et al. ......................... 364/405 |
| 4,611,286 | 9/1986 | Nishimura et al. . |
| 4,625,275 | 11/1986 | Smith . |
| 4,630,200 | 12/1986 | Ohmae et al. ...................... 364/405 |
| 4,699,532 | 10/1987 | Smith . |
| 4,812,986 | 3/1989 | Smith ................................. 364/479 |
| 4,870,596 | 9/1989 | Smith . |
| 4,894,784 | 1/1990 | Smith . |

FOREIGN PATENT DOCUMENTS 00441 1/1986 World Int. Prop. O. .

OTHER PUBLICATIONS

"H. B. Horbinger Service Inc.", Fortune Magazine, Feb. 17, 1986.
"Gurnee firm develops device to speed up checkout lines", Waukegan News-Sun, Nov. 21, 1985.

Primary Examiner—Jerry Smith
Assistant Examiner—Steven G. Kibby
Attorney, Agent, or Firm—Michael A. O'Neil

[57] ABSTRACT

A negotiable instrument dispensing system wherein the dispenser is located at the point-of-sale and coupled to a cash register through which an operator can ring up the sale of the negotiable instrument, such as a money order, on the cash register which commands the dispenser to issue the instrument in the proper amount. If the instrument issuer and the agent for the issuer are two separate entities, a first computer controls the dispenser to limit the liability of the issuer while the second computer continuously informs the agent of its instantaneous liability.

2 Claims, 1 Drawing Sheet

SYSTEM AND APPARATUS FOR DISPENSING NEGOTIABLE INSTRUMENTS

This is a continuation of application Ser. No. 245,346 filed on Sep. 16, 1988 now abandoned.

TECHNICAL FIELD

The present invention relates to automated negotiable instrument dispensers and, in particular, to automated money order dispensers located at a point-of-sale such as the checkout counter of a supermarket, convenience stores, the teller stations of a bank, and the like.

BACKGROUND OF THE INVENTION

Money order dispensing machines are well known in the prior art. Such machines typically include a number of moveable printing levers and a printing control arm. In response to a customer request, the machine operator positions the printing levers at a position corresponding to the requested amount of the money order, inserts a blank order in the machine and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and an issuer portion, and printing different numerical amounts thereon. Such counterfeiting techniques are facilitated by the simple mechanical nature of the prior art money order dispenser wherein blank money orders are inserted one at time for manual printing. In addition, the manual operation also makes the dispenser cumbersome to use and extremely slow to operate.

Improvements have been made in such dispensing machines as set forth in U.S. Pat. No. 4,625,275 wherein one or more sets of money order dispensers are connected to one or more data collector devices, respectively, with the data collector devices, in turn, connected to a host device for controlling the overall operation of the system. In general, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alpha numeric indicia on the dispensed money orders.

There is a need for a negotiable instrument dispensing system and apparatus wherein the dispenser is located near a point-of-sale device, such as a cash register in a supermarket, or in a cconvenience store. In such case, the issuer of the instrument, which may be an institution such as a bank, an individual or any other entity, needs to be able to limit liability by controlling the number of instruments which can be issued by the dispenser over some predetermined period of time, the maximum value of any one of the instruments, and the total value of all the issued instruments in some predetermined amount. In like manner, the point-of-sale operator in whose establishment the machines are placed, the agent of the issuer, is also, of course, liable to the instrument issuer for the value of the instruments issued and therefore, must also be able to limit his liability. Consequently, the agent must be able also to determine the number of instruments issued over a particular period of time and the total dollar amount of the instruments issued.

In some cases, of course, the instrument issuer may also be the point-of-sale operator. For instance, in a bank, the bank itself may issue a negotiable instrument such as a money order. It may have a plurality of money order dispensers, one at each teller station. The instrument issuer, the bank, will have a central computer coupled to each of the money order dispensers at the respective teller stations to control the dispenser and limit the number of money orders which can be issued over a predetermined period of time, in a predetermined maximum individual instrument value, and in a predetermined total amount. However, in a supermarket, where a money order dispenser is located at and associated with, each of the cash registers at a checkout station, the check issuer, which may be a bank, may be remotely located from the supermarket and yet must have the capability to protect its liability. In that case, a remotely located computer will be in contact with the negotiable instrument dispenser through telephone lines or other communication channels to issue instructions to the dispenser to control the operation of the machine and limit the issue of a predetermined number of negotiable instruments over a predetermined period of time totaling a predetermined amount of dollar value. In like manner, since the point-of-sale operator, the agent such as a supermarket, must be accountable to the instrument issuer for the amount of instrument dispensed by the agent, it, the supermarket or agent, must also have the ability to limit its liability by checking on how many instruments have been issued over a predetermined period of time and their total value.

Thus, with this system, fraud by employees is eliminated or minimized, there is an accurate and efficient capture of sales information, and there is a system which is relatively easy to use to dispense negotiable instruments such as money orders by the check issuer's agents.

SUMMARY OF THE INVENTION

The present invention provides a system and apparatus for dispensing negotiable instruments at one or more stations in one or more retail establishments. While such negotiable instruments may be of various types, for ease of explanation, the preferred embodiment of the invention will describe a system and apparatus for dispensing money orders.

In the preferred embodiment, the system for issuing money orders in at least one retail establishment requires at least one money order dispenser for issuing the money orders at the retail establishment. A digital processor in the dispenser controls the operation of the dispenser in accordance with a stored program. A memory is associated with the digital processor for storing not only the dispenser transaction data relating to money orders issued but also the program for controlling the operation of the digital processor. A printer with a compartment for storing blank money order forms is coupled to the money order dispenser for receiving a money order from the compartment and printing out the alphanumeric indicia thereon. A cash register is coupled to the dispenser and may be provided with a keyboard for sending money order dispensing instructions to the dispenser for use by the digital processor control program. The cash register also receives the transaction data from the dispenser.

A computer under the control of the issuer may be remotely located from the retail establishment and coupled to the dispenser through any type of communication channel such as the telephone line for selectively altering the dispenser digital processor control program, and thereby controlling such variables as: the number of money orders that can be issued in a given period of time, the maximum value of each money order, and a predetermined total value of money orders issued to provide security for the instrument issuer. Security codes may also be issued to the dispenser and cash register to control communication between system elements. The computer also receives the transaction data stored in the dispenser memory so that it can determine at any given time the details concerning the negotiable instrument issued.

In accordance with other features of the invention, the remotely located computer may be coupled to the cash registers for receiving the transaction data stored therein and for transferring security code information from the remote computer to the case register when the access code to the money order dispenser has been altered to enable continued communication between them.

Another important feature of the invention is to provide a money order dispenser system in which the cash register stores the transaction information necessary for a computer, located at the point-of-sale, to determine the agent's liability and a remotely located computer coupled to the money order dispenser to enable the issuer of the money order not only to maintain a constant check on his liability for issued money orders, but also to limit the issuer liability by having control over the operation of the dispenser to cause operation to cease at any predetermined event occurrence.

Still another important feature of the present invention is to enable the operation of a plurality of the dispensers at one point-of-sale such as, for instance, a plurality of bank teller stations, where the bank is the issuer and thus the issuer computer is or can be located in the same area as the point-of-sale and yet, be coupled to each of the dispensers to enable a continual supervision of each of the dispensers to determine the liability of the issuer for money orders issued by each dispenser and for all the dispensers in total.

Another important feature of the invention is to enable the operation of a plurality of dispensers at a point-of-sale which is remote from the money order issuer. Such a situation can occur at a supermarket where each of the checkout stations has a dispenser coupled to a case register. In such event, the issuer computer is remotely located from the establishment or point-of-sale but is coupled to each of the dispensers not only to determine the liability of the issuer at any given instant, but also limit that liability by placing controls or constraints over the issuance of money orders under any given condition. In addition, at the point-of-sale, where the agent of the issuer is dispensing the money orders, such as the supermarket, the agent point-of-sale computer is coupled to the cash registers to continually apprise the agent of his liability at any given instant for the issuance of these money orders.

Under certain conditions it may be desirable to couple the issuer computer directly to the agent computer in order to exchange information concerning the operation of the system such as security codes and access codes.

Further, it may be desirable under some certain circumstances to enable the agent computer to be directly connected to the money order dispenser in order to obtain transaction information relating to that dispenser. In such case, there may be, if desired, two memories in the dispenser with one of the memories being coupled to the issuer computer and the second memory being coupled to the agent computer. This allows the issuer computer to control the operation of the dispenser independently of the agent computer while allowing the agent computer to keep a continual check on the agent's liability.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
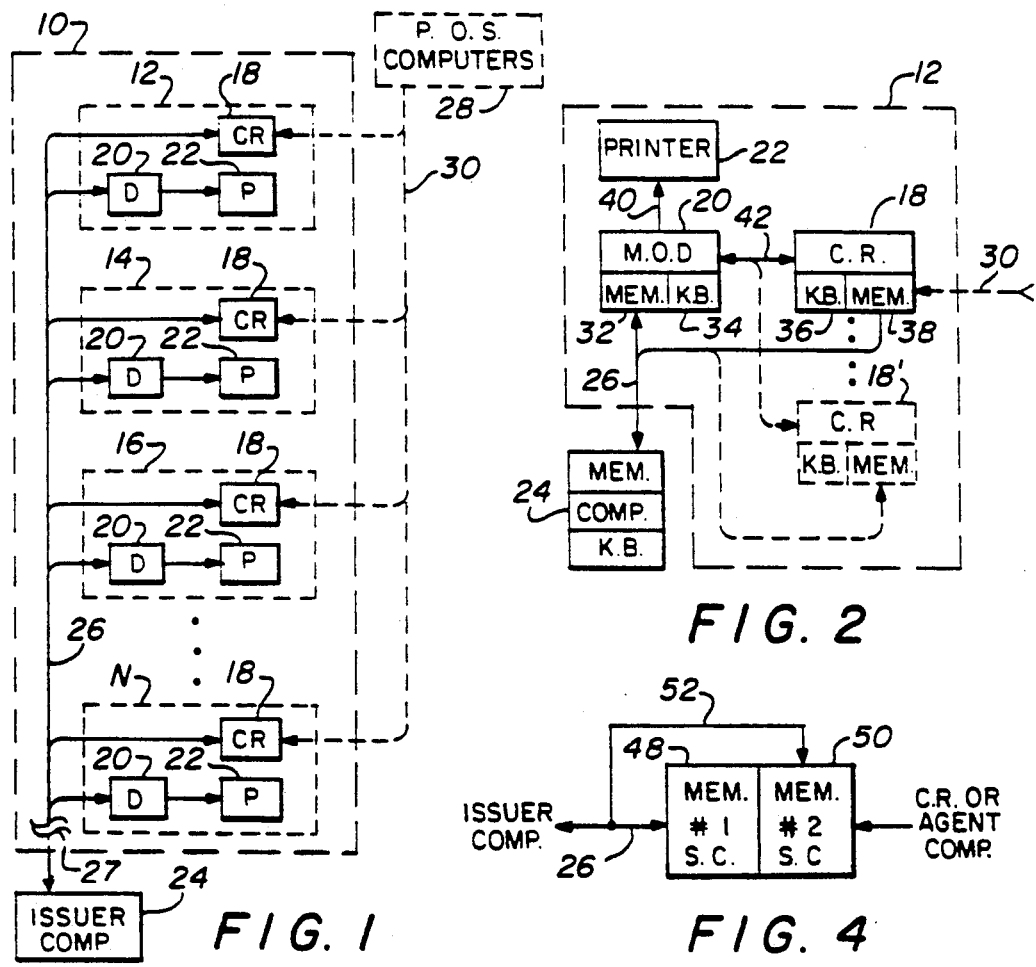
FIG. 1 is a diagrammatic representation of a generalized system of the present invention which includes a plurality of dispensers at a point-of-sale remote from the issuer such as the checkout counters in a supermarket.

With reference now to the figures wherein like reference characters designate like or similar elements, FIG. 1 is a diagrammatic representation of a negotiable instrument dispensing system according to the present invention. While the system can be used for any type of negotiable instrument, for simplicity and ease of description, the preferred embodiment will be disclosed herein with reference to money order dispensers.

As can be seen in FIG. 1, a point-of-sale 10 may be a department store, supermarket, or the like, which has a plurality of cash register stations 12, 14, 16 and so forth through N such stations. Each station will include a cash register 18, a money order dispenser 20 and a printer 22.

In any such transaction, there is an individual or company known as the negotiable instrument issuer, or in this case, a money order issuer, that is ultimately liable for redeeming the purchased money orders that are presented to it. If the issuer is an organization such as a bank, for instance, it may have its own money order dispenser stations at each of a plurality of locations such as teller locations. In that case, the issuer has a computer 24 which is located at the point-of-sale (the bank) and is coupled to each of the stations 12 - - - N for housekeeping and security. Thus, the computer 24 can be keep track of the number of checks issued, the amounts issued, the dates issued and the like. In such case, security codes in the cash register 18 and the dispensers 20 can be changed as needed through computer 24 to prevent unauthorized dispensing of a money order through the fraudulent activities of an individual who is acquainted with the system.

In other instances, the point-of-sale 10 may be, as indicated earlier, in a supermarket or other retail establishment where there are a plurality of the stations 12 - - - N. In such case, the issuer computer 24 may be remotely located from the point-of-sale location as indicated by break 27 in line 26 and could be continuously or selectively coupled through telephone lines or other corresponding communication channels 26 to the various cash registers 18 and money order dispensers 20. Since, in such case, the point-of-sale establishment is the agent of the issuer and is liable to the issuer for the amount of money orders or other negotiable instruments dispensed, the agent will also want to know the status of the dispensers including the number of money orders issued, perhaps the time, and the dollar amounts of the money orders both individually and collectively. In such case, there may be a point-of-sale computer 28, indicated in FIG. 1 by dashed lines, coupled through cables or other communication channels 30 to the cash registers 18 at the various stations 12 - - - N.

Further, the issuer computer 24 may be coupled to a plurality of the retail establishments 10 to control and monitor operation of the dispenser at each of the establishments.

Figure 2:
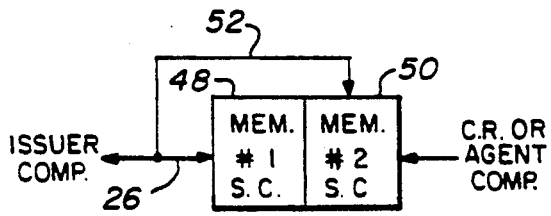
FIG. 2 is a diagrammatic representation of the detailed coupling between the cash register, the money order dispenser, the issuer computer and the printer at the point-of-sale such as a checkout stand in a supermarket.

One of the stations 12 in FIG. 1 is shown in detail in FIG. 2. Again, the issuer computer 24 is coupled through channel 26 to the money order dispenser 20 as well as to the cash register 18. Money order dispenser 20 also has a memory 32 and a keyboard 34. The memory 32 stores the security codes and the housekeeping program which keeps track of the number of money orders issued, the time issued, the dollar amount and the like. For instance, such program in memory 32 may require the dispenser 20 to call the issuer computer 24 at predetermined time intervals indicating, among other details, the number of money orders sold, the dollar amount of each money order and perhaps the total dollar amount of all the money orders sold. At that time, the issuer computer could then, if desired, transmit a command or a reauthorization code to the dispenser 20 so that it can continue to issue money orders. In this manner, the issuer can keep track of and limit the liability of the issuer. The issuer computer 24 may transmit one security code to the dispenser 20 so that the dispenser 20 can identify the issuer computer 24 during communications between the units. It may also issue a second security code to the dispenser so that it can recognize the cash register 18 to enable communications to take place between the cash register 18 and the dispenser 20. The money order dispensers 20 may be totally independent of each other where there are a series of stations and thus, are controlled independent of each other. Therefore, each dispenser 20 may have a keyboard 34 which could be operated to manually input data into the dispenser to cause checks to be issued. This enables existing dispensers to be utilized with the system.

Assuming that the station shown in FIG. 2 is one of the plurality of stations 12 - - - N in FIG. 1 where the point-of-sale is a retail establishment having a plurality of stations such as a retail establishment, the system operates as follows:

The purchaser brings a plurality of items or goods to one of the cash register checkout stations and presents them to the clerk who rings them up on the cash register 18 through keyboard 36. At the same time, the purchaser asks the clerk for a money order in the amount of "X" dollars. The clerk simply enters the dollar amount of the money order into the cash register keyboard 36 and then depresses a preselected key for communication with the money order dispenser 20. Cash register 18 then instructs money order dispenser 20 to issue a money order in the amount of "X" dollars. To do this, it sends a security code to the money order dispenser 20 which recognizes that code by comparing it to the security code stored in its memory 32 by issuer computer 24. It then accepts the commands from cash register 18 and instructs printer 22 through line 40 to print the money order in the proper amount. The clerk takes the money order from the printer, presents the bill to the customer for the total amount of purchase including the items purchased as well as the money order and when the clerk has received the money, presents the customer with the money order along with the other items that he has purchased. Not only does the memory 38 in cash register 18 keep track of the transaction in terms of the time, the amount and the number of money orders issued, but it also stores the security codes received from the issuer computer 24 via line 26. In addition, of course, as stated previously, the money order dispenser 20 also retains the transaction information in its memory 32 for a selected length of time for access by the issuer computer 24 on line 26 so that the issuer can keep track of tis liability. Further, as stated previously, the agent at the point-of-sale through computer 28 and channel 30 can access the memory in cash register 18 so that the agent can keep track of its liability to the issuer.

As shown in FIG. 2, a plurality of cash registers 18 through 18' can be coupled to a single money order dispenser 20 if necessary. In such case, however, inputs from the cash registers 18 and 18' to the dispenser 20 would be required to be timed or multiplexed so that the dispenser can handle commands from the cash registers in an orderly fashion. This system would be especially attractive for a small number of dispensing stations at the point-of-sale.

Figure 3:
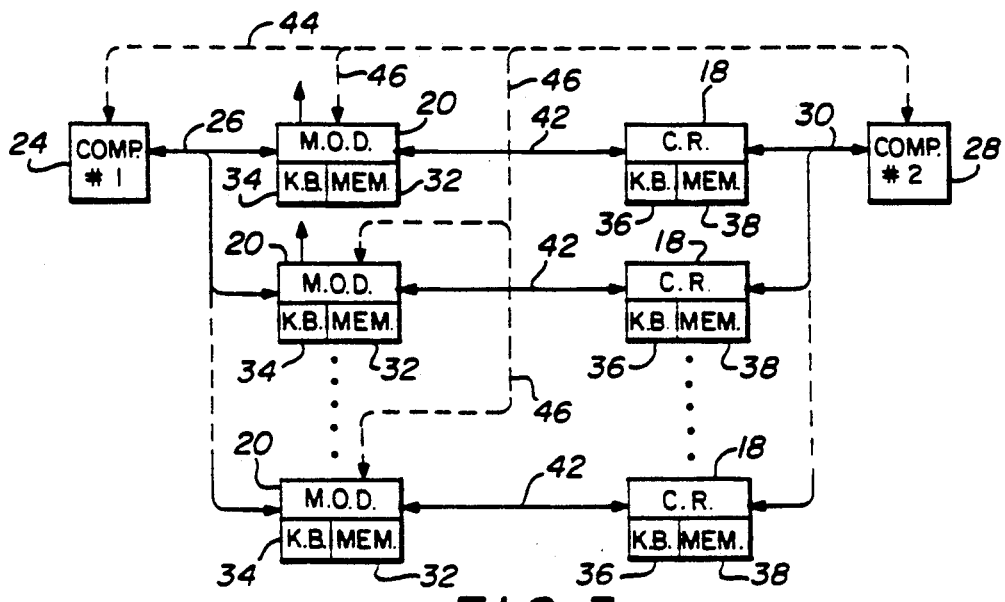
FIG. 3 is a diagrammatic representation of a system according to the present invention in which the issuer computer is coupled to each of the money order dispensers as well as the agent's computer while the agent's computer is coupled not only to each of the cash registers at the point-of-sale but also to each of the money order dispensers at the point-of-sale.

A further embodiment of the proposed system is illustrated in FIG. 3. The circuit of FIG. 3 is similar to that shown in FIG. 1 wherein a issuer computer 24 is coupled on line 26 to a plurality of money order dispensers 20. In like manner, the agent computer 28 at the point-of-sale is connected through channel 30 to a plurality of cash registers 18. In addition, the cash registers 18 and money order dispensers 20 communicate with each other through connection 42. However, in FIG. 3, the issuer computer 24 may communicate directly with the agent computer 28 through channel 44. In addition, the agent computer 28 may communicate directly with each of the money order dispensers 20 through channel 46. This enables the issuing computer 24 to transfer to the agent computer 28 security codes necessary to communicate with the cash register 18 and the money order dispensers 20. Such a system may be advantageous in allowing for less transfer of data which has to take place between the cash register 18 and the money order dispenser 20. The agent computer 28, of course, does not have the ability to change security codes in the memory of the money order dispensers 20. It can, however, by knowing a security code from issuer computer 24 access the money order dispenser 20 to obtain the transactional information that is stored in the memory 32 of the money order dispenser.

Figure 4:
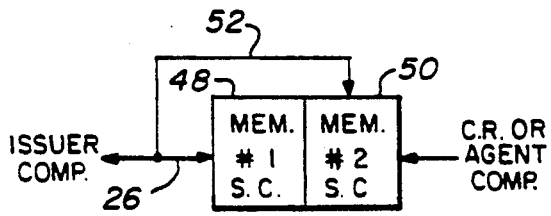
FIG. 4 is a diagrammatic representation of an embodiment in which two memories are in each money order dispenser one of which contains a code which recognizes the check issuer computer so that it cannot be accessed by other computers. This code enables the check issuer computer to control the operation of the dispenser by changing security codes, the number of money orders to be issued, the period of time over which such money orders are to be issued and the total amount of the money orders to be issued. These operations can be controlled independent of each other with one memory storing a code which enables the money order dispenser to recognize both the issuer computer and the agent computer as well as the cash register so that it will accept inputs from them to control the operation of the dispenser and determine its status.

In such case, as shown in FIG. 4, the memory of the money order dispenser would have two sections, section 48 and section 50. Section 48 would receive the security codes from the issuer computer on line 26 which allows the program to be changed by the issuing computer 24. However, the issuer computer 24 is also coupled to memory 50 through conductor 52 which allows a security code to be placed therein so that the cash register 18 or agent computer 28 may have access to memory 52 to obtain transaction data stored therein.

Thus, there has been disclosed a system for issuing negotiable instruments in which a negotiable instrument dispenser is located at a predetermined site. A digital processor forms part of the dispenser for controlling the operation of the dispenser in relation to the number of instruments issued in a given period of time and having a predetermined total value in accordance with a stored program. A memory is associated with the digital processor for storing the dispenser transaction data relating to the negotiable instruments issued and the control program for the digital processor. A printer having stored blank negotiable instrument forms is coupled to the dispenser, and, upon command from the dispenser, receives one of the negotiable instrument forms and prints alphanumeric indicia thereon. A cash register is coupled to the dispenser for receiving the transaction data. The cash register has a keyboard for sending negotiable instrument dispensing instructions to the dispenser for use by the digital processor control program to cause the instrument to be issued by the printer. Further, an issuer computer may be remotely located from the predetermined location and is coupled to the dispenser for selectively altering the control program and for receiving the transaction data stored in the memory associated with the digital processor.

Further, the issuer computer which is remotely located from the predetermined location such as a retail establishment, may be coupled to the cash register memory for receiving the transaction data stored therein. Also, the agent's computer at the point-of-sale may be coupled to either the cash register memory of the dispenser memory for obtaining the transaction data and may also be directly connected to the issuer computer in order to obtain security codes necessary to communicate with either the cash register or the money order dispenser.

Although the invention has been described and illustrated in detail, it is to be understood that the same is by way of illustration and example only and is not to be taken by way of limitation. The spirit and scope of the invention are to be limited only by the terms of the appended claims.

I claim:

1. A system for dispensing money orders at at least one retail establishment at the request of a purchaser comprising:

a money order dispenser for dispensing money orders at a retail establishment;

a digital processor in the dispenser for controlling the operation of the dispenser in accordance with a stored program;

a memory associated with the digital processor for storing dispenser transaction data relating to money orders dispensed, for storing a security code that authorizes printing of the money orders, and for maintaining the program for controlling the dispenser;

a compartment in the dispenser for storing blank money order forms;

a printer in the money order dispenser for printing alphanumeric indicia on the money order forms upon command from the digital processor and thereby issuing money orders;

issuer control means located remote from the retail establishment for selectively changing the security code stored within the memory of the dispenser;

a cash register located at the retail establishment for recording retail purchases, including money order sales, the cash register being coupled to the money order dispenser, the cash register having a keyboard for transmitting a security code to the digital processor authorizing in accordance with the control program the printing of a money order and for sending money order dispensing instructions to the dispenser for use by the digital processor in accordance with the control program in dispensing money orders as requested by the purchaser;

the cash register further comprising means for receiving transaction data from the money order dispenser and for presenting a total of the amount of purchase including the dollar amount of the money order;

memory means in the cash register for storing the transaction data received from the money order dispenser; and a computer located at the retail establishment and coupled to the cash register for receiving the transaction data stored by the cash register memory means.

2. A system for dispensing money orders at at least one retail establishment at the request of a purchaser comprising:

a plurality of money order dispensers for dispensing money orders at separate stations in a retail establishment;

a digital processor in each dispenser for controlling the operation of the dispenser;

a memory associated with each digital processor for storing dispenser transaction data related to money orders dispensed, for storing a security code that authorizes printing of the money orders and for providing a control program for the dispenser;

a printer for each dispenser including a compartment for storing blank money order forms and coupled to the respective money order dispenser for receiving a money order from the compartment and printing alphanumeric indicia thereon on command from the digital processor;

a plurality of cash registers located at the retail establishment for recording retail purchases and at least one cash register being connected to at least one of the money order dispensers;

means in the cash register for transmitting a security code to the digital processor of the dispensers authorizing the printing of the money orders and for transmitting money order dispensing instructions to the respective dispensers for use by the digital processor in accordance with the control program to command the printer to print the money order as requested by the purchaser and for presenting a total of the amount of purchase including the dollar amount of each money order;

the cash register further comprising memory means for receiving and storing transaction data from the dispenser;

an issuer computer remotely located from the retail establishment and coupled to each of the money order dispensers for selectively altering the data processing control program for each dispenser and receiving the transaction data from each of the dispenser memories.

* * * * *